(12) United States Patent
Alexopoulos et al.

(10) Patent No.: US 6,714,382 B1
(45) Date of Patent: Mar. 30, 2004

(54) SELF-LIMITING WEAR CONTACT PAD SLIDER AND METHOD FOR MAKING THE SAME

(75) Inventors: Pantelis S. Alexopoulos, San Jose, CA (US); Lee K. Dorius, San Jose, CA (US); Francis Chee-Shuen Lee, San Jose, CA (US); Timothy C. O'Sullivan, San Jose, CA (US); Gurinder Singh, San Jose, CA (US)

(73) Assignee: Hitachi Global Storage Technologies (NL)

( * ) Notice: Subject to any disclaimer, the term of this patent is extended or adjusted under 35 U.S.C. 154(b) by 0 days.

(21) Appl. No.: 09/687,234

(22) Filed: Oct. 13, 2000

(51) Int. Cl.$^7$ .................................................. G11B 5/60
(52) U.S. Cl. ................................................... 360/235.8
(58) Field of Search .................... 360/235.8, 236.7, 360/235.7, 235.4, 235.1, 236, 234

(56) References Cited

U.S. PATENT DOCUMENTS

| | | | |
|---|---|---|---|
| 4,777,544 A | | 10/1988 | Brown et al. |
| 5,327,310 A | | 7/1994 | Bischoff et al. |
| 5,473,485 A | * | 12/1995 | Leung et al. ............. 360/237.1 |
| 5,488,524 A | | 1/1996 | Cunningham |
| 5,617,273 A | | 4/1997 | Carr et al. |
| 5,761,003 A | | 6/1998 | Sato |
| 5,991,110 A | | 11/1999 | Sakai et al. |
| 5,991,118 A | * | 11/1999 | Kasamatsu et al. ....... 360/236.6 |
| 5,995,324 A | * | 11/1999 | Haddock et al. .......... 360/234.7 |
| 6,040,958 A | * | 3/2000 | Yamamoto et al. ....... 360/235.6 |
| 6,040,965 A | | 3/2000 | Terunuma et al. |
| 6,160,683 A | * | 12/2000 | Boutaghou ................ 360/237.1 |
| 6,198,600 B1 | | 3/2001 | Kitao et al. |
| 6,219,332 B1 | * | 4/2001 | Boutaghou ................ 360/243.3 |
| 6,226,151 B1 | * | 5/2001 | Haddock .................. 360/236.6 |
| 6,230,380 B1 | * | 5/2001 | Wang et al. .............. 360/234.3 |
| 6,333,835 B1 | * | 12/2001 | Kang et al. .............. 360/235.4 |
| 6,377,422 B1 | * | 4/2002 | Boutaghou et al. ....... 360/234.7 |
| 2002/0075593 A1 | * | 6/2002 | Ultican et al. ........... 360/235.7 |

FOREIGN PATENT DOCUMENTS

EP  452 846 A2  10/1991

OTHER PUBLICATIONS

Yeack-Scranton et al., "An Active Slider For Practical Contact Recording," IEEE Transactions on Magnetics, vol. 26, No. 5, Sep. 1990, pp. 2478–2484.

* cited by examiner

Primary Examiner—George J. Letscher
Assistant Examiner—C R Beacham
(74) Attorney, Agent, or Firm—Crawford Maunu PLLC

(57) ABSTRACT

The present invention provides a non-actuatable, self-limiting wear contact pad slider and method for making the same. A protruding element surrounding the transducer is fabricated using a third etch step so that the protruding element has a height that is greater than or equal to the designed fly height of the aerodynamic lift surface minus the disk roughness.

26 Claims, 6 Drawing Sheets

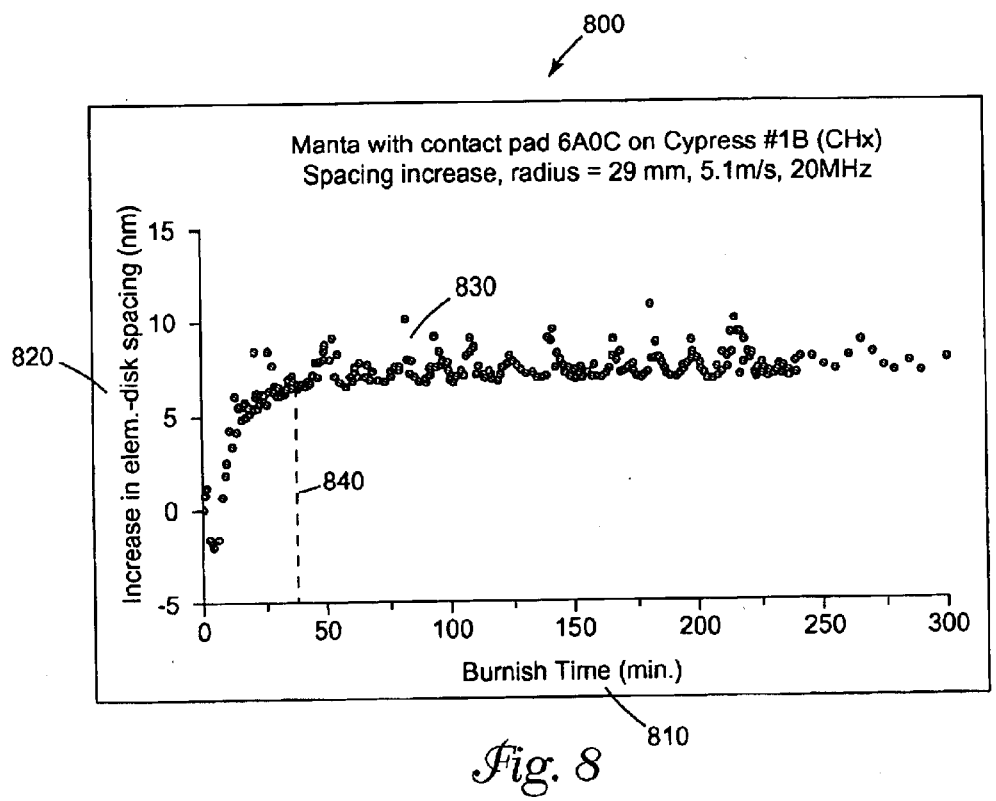
*Fig. 8*
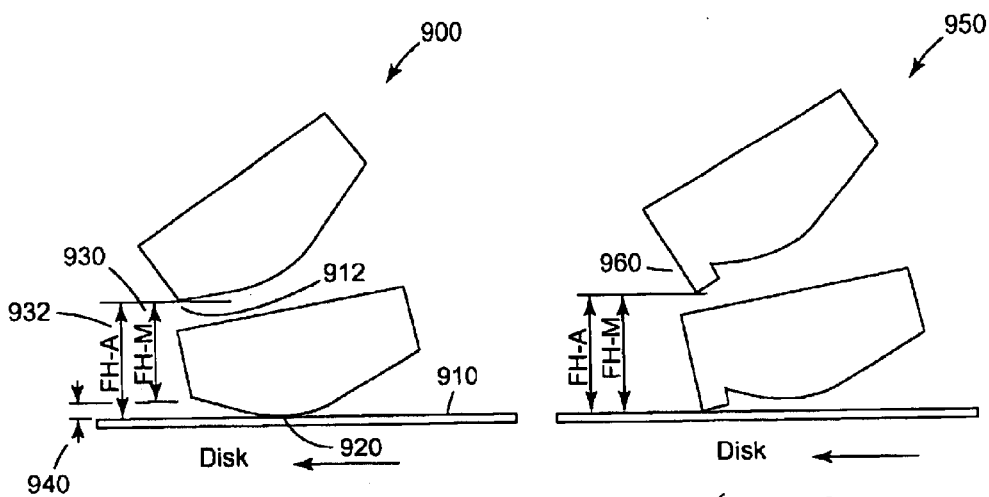
*Fig. 9a*
*Prior Art*
*Fig. 9b*

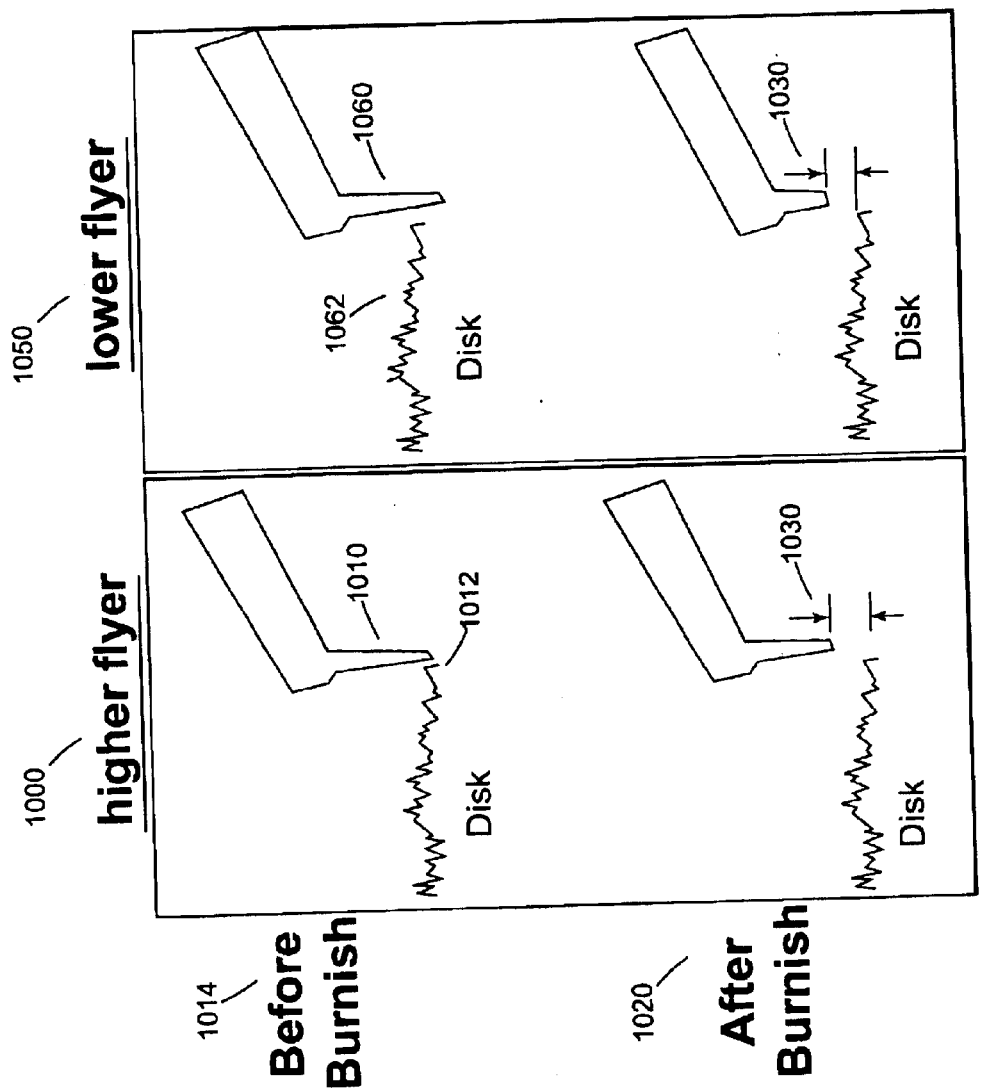

SELF-LIMITING WEAR CONTACT PAD SLIDER AND METHOD FOR MAKING THE SAME

BACKGROUND OF THE INVENTION

1. Field of the Invention

This invention relates in general to data storage systems, and more particularly to a self-limiting wear contact pad slider and method for making the same.

2. Description of Related Art

Fixed magnetic disk systems, typically referred to as "hard" disk drives, are now commonplace as the main non-volatile storage in modern personal computers, workstations, and portable computers. Such hard disk drives are now capable of storing gigabyte quantities of digital data, even when implemented in portable computers of the so-called "notebook" class. Many important advances have been made in recent years that have enabled higher data density and thus larger storage capacities of hard disk drives, and that have also enabled much faster access speeds, both in the bandwidth of data communicated to and from the hard disk drive, and also in the access time of specified disk sectors. Advances have also been made that have greatly reduced the size and weight of hard disk drives, particularly as applied to portable computers, have been made over recent years. These advances have resulted in the widespread availability of ultra-light portable computers, yet having state-of-the art capability and performance.

A head/disk assembly typically comprises one or more commonly driven magnetic disks rotatable about a common spindle and cooperating with at least one head actuator for moving a plurality of transducers radially relative to the disks so as to provide for the reading and/or writing of data on selected circular tracks provided on the disks. The magnetic transducer or "head" is suspended in close proximity to a recording medium, e.g., a magnetic disk having a plurality of concentric tracks. The transducer is supported by an air bearing slider mounted to a flexible suspension. The suspension, in turn, is attached to a positioning actuator.

During normal operation, relative motion is provided between the head and the recording medium as the actuator dynamically positions the head over a desired track. The relative movement provides an air flow along the surface of the slider facing the medium, creating a lifting force. The lifting force is counterbalanced by a predetermined suspension load so that the slider is supported on a cushion of air. Air flow enters the leading edge of the slider and exits from the trailing end. The head resides toward the trailing end, which tends to fly closer to the recording surface than the leading edge.

The recording medium holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics.

Another important factor affecting fly height is the slider's resistance to changing conditions. If the transducer fly height does not stay constant during changing conditions, data transfer between the transducer and the recording medium may be adversely affected. Fly height is further affected by physical characteristics of the slider such as the shape of the ABS. Careful rail shaping, for example, will provide some resistance to changes in air flow.

Hard drive manufacturers are starting to incorporate proximity recording type sliders in drives in order to achieve higher storage densities. The proximity recording slider is designed to maintain a small area near the read-write element in constant contact with the disk, and thus enabling smaller bit size and ultimately larger storage densities. This approach to increasing storage density puts considerable amount of strain on controlling wear at the slider-disk interface, because a slight variation in contact load and contact area could greatly affect the drive survivability.

Slider-disk contact results in lubricant depletion and degradation, wear of both surfaces, generation of wear particles, stick-slip, etc. All these phenomena affect magnetic performance of the disk drive, e.g., through jitter, as well as its durability. Nevertheless, as mentioned above, a contact slider is key for high-density magnetic recording.

As product fly heights are getting closer to the disk to increase areal density, the ultimate fly height goal will be to put the element in contact with the disk media, thus reducing the fly height to zero. However in practice, a reliable contact interface is very difficult to achieve due to the wear of the head and disk, resulting in early failure when compared to higher fly heights with a cushion of air between them. The reliability problem is exacerbated by manufacturing tolerances which results in significant variation in the amount of interference in the contact interface. Even with a product design point centered nominally at zero fly height or contact, manufacturing tolerances for both disk roughness and head fly height result in a distribution of interference such that half the interfaces will have negative (i.e., too much) interference and wear out prematurely and the other half will have positive (i.e., too little) interference and fly with an air separation which will cause poor magnetic performance.

U.S. Pat. No. 5,761,003, entitled "Magnetic head slider with crown ABS", issued Jun. 2, 1998, to Toshiharu Sata, which is assigned to Citizen Watch Co., Ltd., and which is incorporated by reference herein, discloses a magnetic head slider including a crown air-bearing surface (ABS) adapted to be located opposite to a magnetic disk. The ABS includes a rear pad with a convexly curved upper surface, arranged at a center of the air-discharging end and longitudinally spaced from the boundary. The rear pad has such a small dimension that a dynamic pressure due to the air introduced onto the ABS is hardly applied to the rear pad. However, the slider design is not made to fly in contact with the disk such that the interference is zero over a wide range of manufacturing tolerances.

One slider design that attempts to achieve contact recording is disclosed in "An Active Slider For Practical Contact Recording", IEEE Transactions On Magnetics, Vol. 26, No. Sep. 5, 1990, pp. 2478–2483, by C. E. Yeak-Scranton et al. (herein referred to as "Active Slider article"). In the "Active Slider article" active material is laminated into a thin-film head to form an actuatable bender at the trailing end of the slider. The actuatable area allows the recording head to be raised or lower thereby providing contact recording when needed, but preventing rapid failure of the interface. Nevertheless, the design is complex because it requires not only additional processing steps to add the laminated active material, but also additional circuitry to control and supply the bender drive voltage.

It can be seen then that there is a need for a simple head design that can be made to fly in contact with the disk such that the interference is zero over a wide range of manufacturing tolerances.

SUMMARY OF THE INVENTION

To overcome the limitations in the prior art described above, and to overcome other limitations that will become apparent upon reading and understanding the present specification, the present invention discloses a self-limiting wear contact pad slider and method for making the same.

The present invention solves the above-described problems by fabricating a protruding element surrounding the transducer using a third etch step so that the protruding element has a height that is greater than or equal to the designed fly height of the aerodynamic lift surface minus the disk roughness.

A slider in accordance with the principles of the present invention includes a support structure having a leading and a trailing edge relative to the motion of the recording medium and an air bearing structure positioned on the support structure extending to the trailing edge of the support structure, the air bearing structure having an air bearing surface and a non-actuatable, wearable pad positioned at the trailing end of the air bearing structure and extending above the air bearing surface, the air bearing surface being formed to provide a desired fly height and the wearable pad having a surface area of less than 5% of a total air bearing surface area and a predetermined height so that wearing of the pad during use produces an interference of zero at the desired fly height and provides negligible lift to the slider.

Other embodiments of a slider in accordance with the principles of the invention may include alternative or optional additional aspects. One such aspect of the present invention is that the air bearing surface further comprises at least one aerodynamic lift surface level generating lift to provide the desired fly height, the non-actuatable, wearable pad comprising a last surface level extending above the at least one surface level of the air bearing surface.

Another aspect of the present invention is that the at least one surface level further comprises two surface levels.

Another aspect of the present invention is that the non-actuatable, wearable pad is formed around a magnetic sensor.

Another aspect of the present invention is that the air bearing surface is formed using two etch steps and the non-actuatable, wearable pad is formed using a third etch step.

Another aspect of the present invention is that the wearable pad forms a fourth surface level to the slider.

Another aspect of the present invention is that the predetermined height of the non-actuatable, wearable pad is selected to be greater than or equal to the desired fly height minus a disk roughness.

Another aspect of the present invention is that the slider further includes at least one front air bearing pad.

Another aspect of the present invention is that the slider further includes side rails extending along sides of the support structure.

Another aspect of the present invention is that the non-actuatable, wearable pad is formed of a material selected from the group comprising alumina, TiC/Al2O3 and silicon.

Another aspect of the present invention is that the non-actuatable, wearable pad is preferably less than 3.5% and more preferably less than 2% and a preferred embodiment is 1%.

In another embodiment of the present invention, a method for forming a slider is provided. The method includes forming a slider body having a first side, a second side, a leading edge and a trailing edge, using at least a first etching to form an air bearing structure on the slider body extending to the trailing edge for providing a desired fly height and using a last etching to form a non-actuatable, wearable pad on the air bearing structure extending to the trailing edge, the wearable pad extending above the air bearing surface and having a surface area of less than 5% of a total air bearing surface area and a predetermined height so that wearing of the pad during use produces an interference of zero at the desired fly height and provides negligible lift to the slider.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 8 illustrates the burnish time versus the increase in element-to-disk spacing;

FIGS. 9a–b illustrate the effect of crown on fly heights; and

FIGS. 10a–b illustrate the self-limiting characteristics of the contact pad slider according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a self-limiting wear contact pad slider and method for making the same. A protruding element surrounding the transducer is fabricated using a third etch step so that the protruding element has a height that is greater than or equal to the designed fly height of the aerodynamic lift surface minus the disk roughness.

Figure 1:
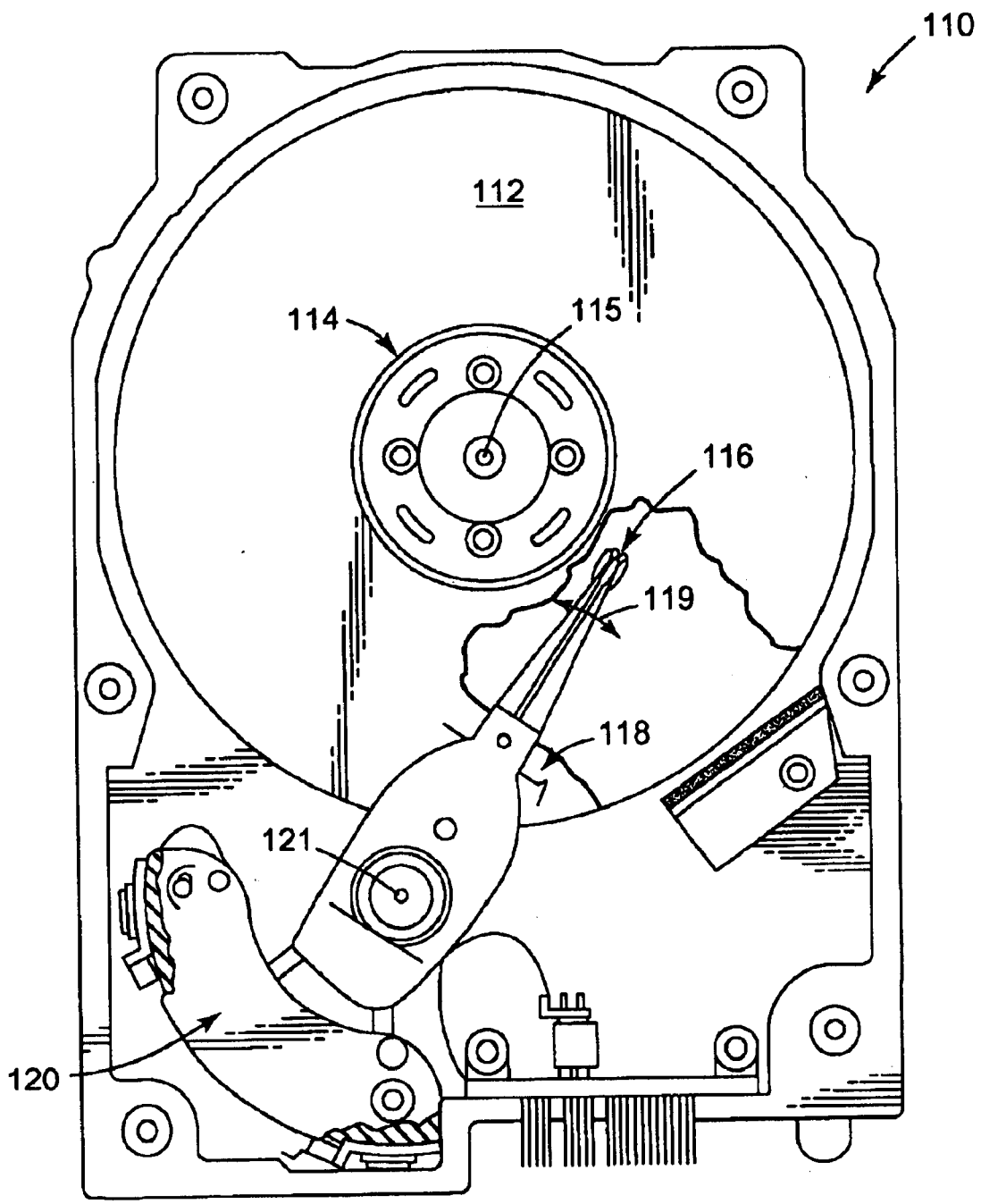
FIG. 1 is a plan view of a disk drive.

FIG. 1 is a plan view of a disk drive 100. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116 which is mounted to at least one actuator assembly 118 in disk drive 100. An actuator assembly as shown in FIG. 1 is of the type known as a rotary moving coil actuator and includes a voice coil motor (VCM) shown generally at 120. A voice coil motor 120 rotates an actuator assembly 118 with its attached HGAs 116 about a pivot axis 121 to position HGAs 116 over desired data tracks on the associated disk surfaces, under the control of electronic circuitry housed within disk drive 100.

More specifically, an actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

Figure 2:
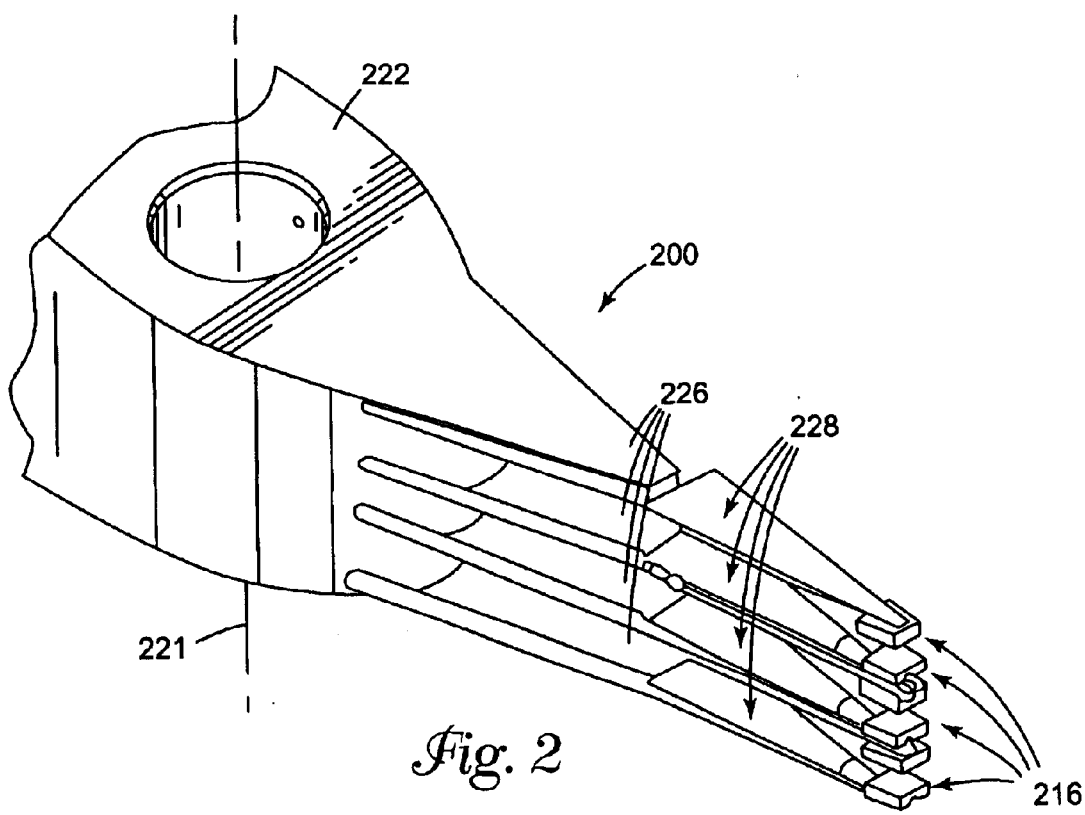
FIG. 2 is a perspective view of an actuator assembly.

FIG. 2 is a perspective view of an actuator assembly 200. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216. According to the present invention, multiple, independently controlled actuator assemblies 200 are provided in a disk drive.

Figure 3:
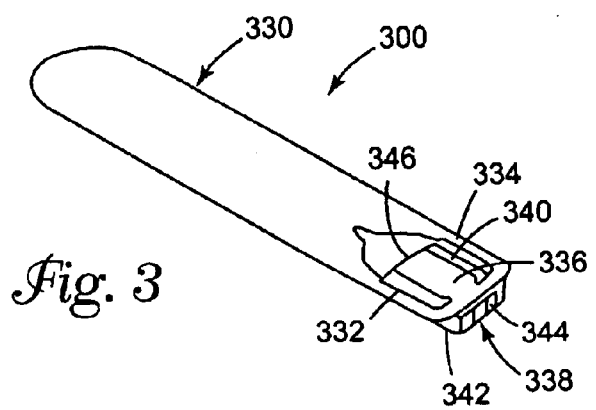
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342. Transducers 344 are also preferably located on a leading edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

A conventional slider design starts off with a flat polished surface, from which a patterned air bearing surface (ABS) is created by a removal process such as etching or ion milling. The ABS surface is always the top most polished surface and pressurizes with positive pressure to lift the ABS up producing an air cushion above the disk. Air bearing surfaces are formed by single or dual etch processing which result in either 2 or 3 surface levels, respectively.

Figure 4:
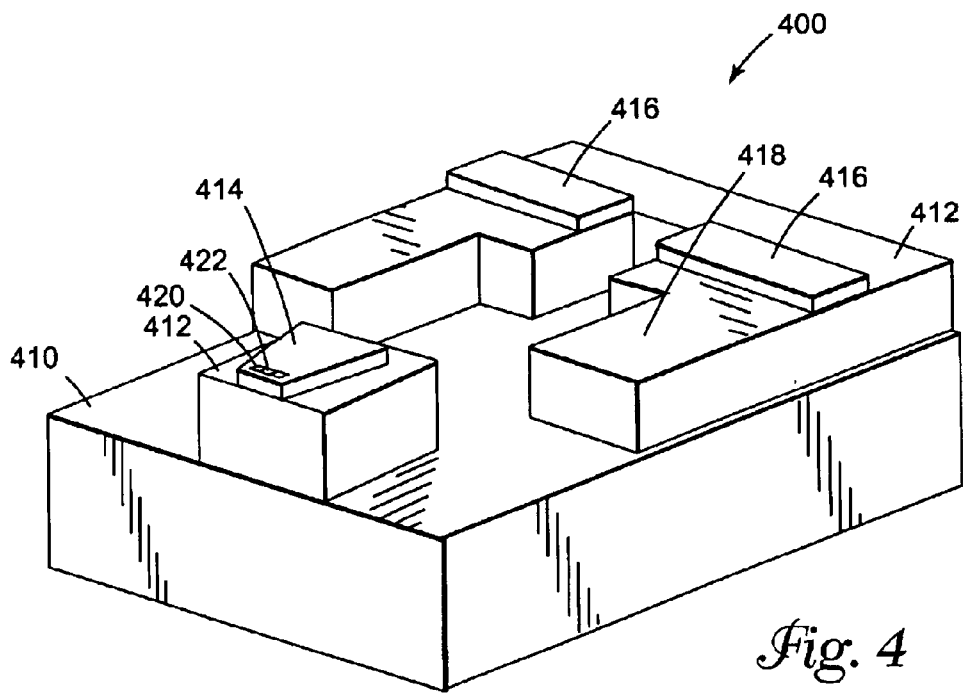
FIG. 4 shows a self-limiting wear contact pad slider according to the present invention.

FIG. 4 shows a self-limiting wear contact pad slider 400 according to the present invention. The slider 400 is formed using a dual etch design with three surface levels 410–416, wherein a third etch is added to produce a fourth surface level 420. Accordingly, the top most surface is now a small, non-actuatable wearable contact pad 420 around the magnetic element pole tips 422. The self-limiting contact pad 420 is wearable in the sense that it is not formed of a hard overcoat that prevents wear, but rather exhibits wear when it comes into contact with the disk surface. This protruding pad 420 is small enough that it does not carry any significant amount of load and thus provides negligible lift to the slider due to its small size. This pad 420 is also small enough so that it will wear quickly and easily and will not affect the fly height as it wears down, which provides the pad 420 with the ability to achieve an interference of zero. The slider is simple to construct and is non-actuatable. The slider comprises one or more materials selected from alumina, $TiC/Al_2O_3$, or silicon. In addition to the rear pad 420, front pads 416 are formed on side rails 418. The air bearing surfaces of the wear pad 420 is less than 5% of the total air bearing surface area, and is preferably less than 3.5% and more preferably less than 2%. In fact, a preferred embodiment is 1%.

Figure 5:
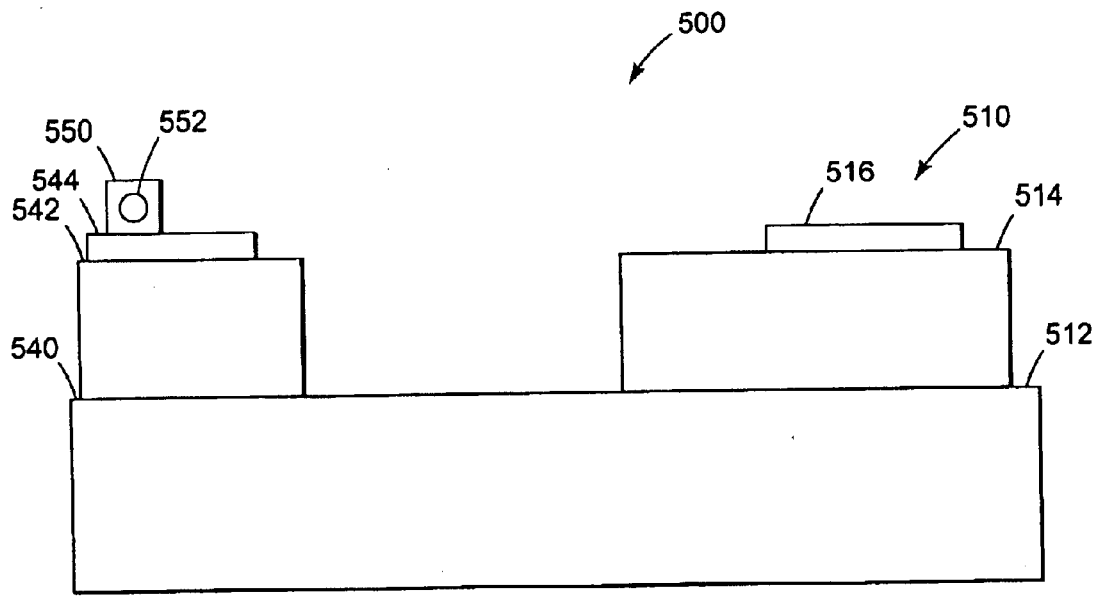
FIG. 5 illustrates a side view of the slider of FIG. 4

FIG. 5 illustrates a side view 500 of the slider of FIG. 4. In FIG. 5, the four levels provided by the three etch steps are clearly evident. The front air bearing surfaces 510 includes three levels 512–516 that are formed using the first two etch steps. The rear air bearing surfaces 530 also include three levels 540–514. The protruding element 550 surrounding the transducer 552 is fabricated using a third etch step so that the protruding element 550 has a height that is greater than or equal to the designed fly height of the aerodynamic lift surface minus the disk roughness.

The air bearing surfaces 516, 544, which pressurize and carry the load of the slider 500, is now the second highest surface created by the third etching process. The depth of the third etch produces a non-actuatable protruding pad 550 that is designed to be greater than or equal to the designed fly height of the original ABS surface prior to receiving this third etch.

Figure 6:
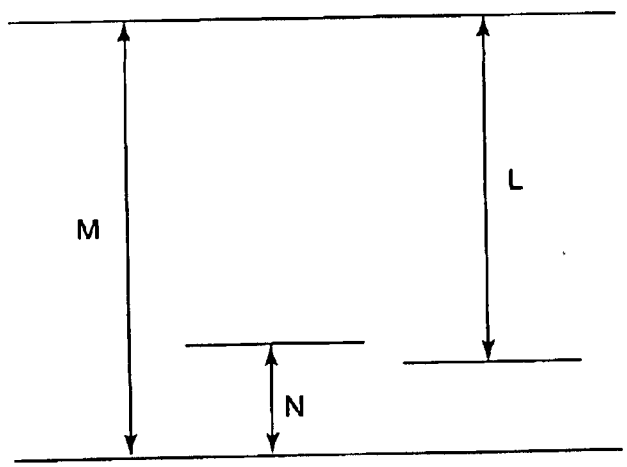
FIG. 6 illustrates the determination of the height of the protruding element surrounding the transducer.

FIG. 6 illustrates the determination of the height of the protruding element surrounding the transducer. The air bearing surfaces of the slider are selected to provide a fly height of "M". The roughness of the disk surfaces is "N". The difference between the fly height "M" and the disk surface roughness "N" is calculated to be "X". Thus, the protruding element surrounding the transducer is fabricated using a third etch step so that the protruding element has a height "L" that is greater than or equal to the designed fly height of the aerodynamic lift surface minus the disk roughness.

The slider thus flies at a certain fly height "M" and has a protruding pad of "L" height which will put it in contact with the disk for a wide range of manufacturing tolerances. When the slider and disk are first put together, the pad will interfere with the disk and will wear down until the interference is zero, at which point, the wear will be self limiting and not continue further. This is because the air bearing surface continues to support and lift the air bearing at its designed fly height.

Figure 7:
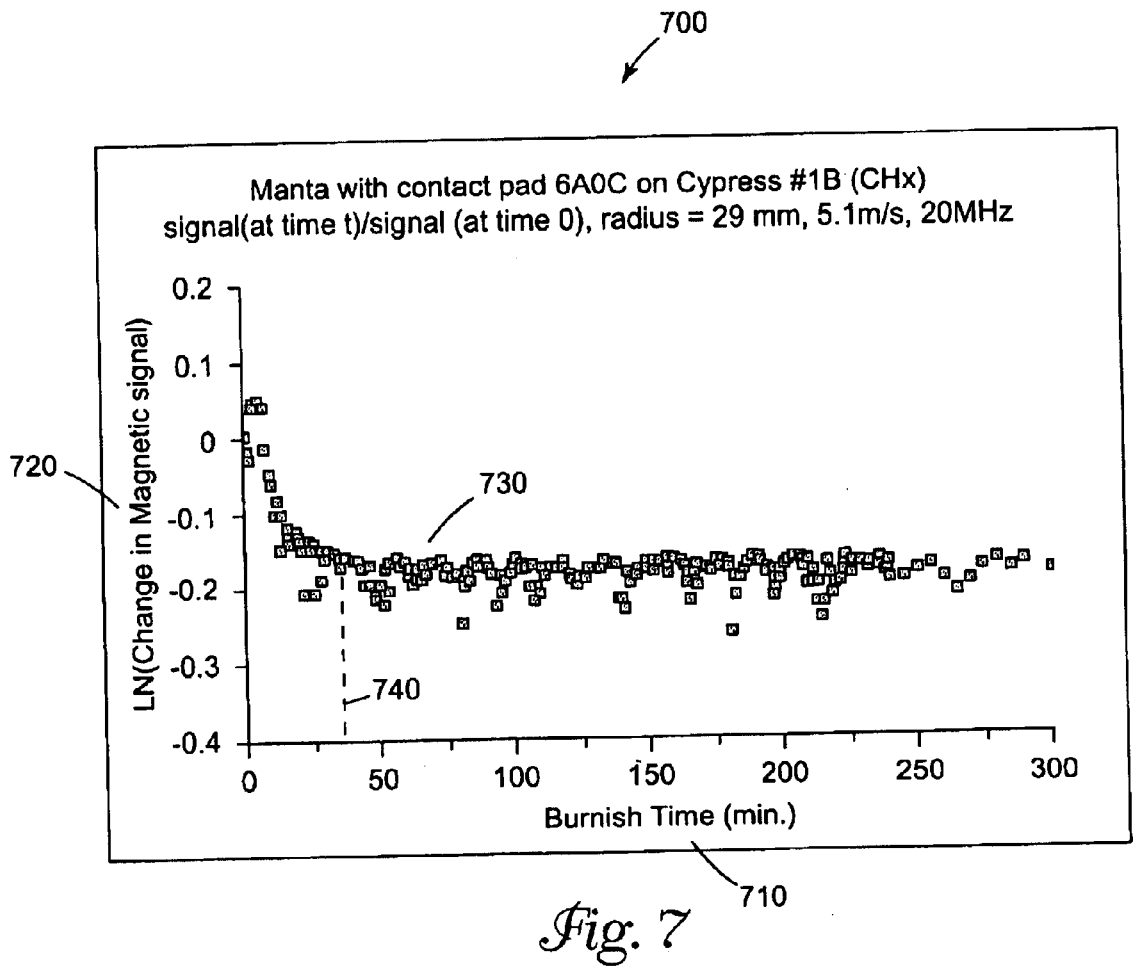
FIG. 7 illustrates the burnish time versus the change in magnetic signal for a slider according to the present invention.

Experiments have shown that this initial wear in process takes place fairly rapidly. FIG. 7 illustrates a graph 700 of the burnish time 710 versus the change in magnetic signal 720 for a slider according to the present invention. FIG. 7 illustrates that the magnetic signal 730 settles within about thirty minutes 740. FIG. 8 illustrates a graph 800 the burnish time 810 versus the increase in element-to-disk spacing 820. FIG. 8 shows that the element-to-disk spacing 830 also settles in about thirty minutes 840. The end result of this design and burn-in process results in a head/disk interface which is at contact or zero interference and which can be reproduced on variety parts with a wide range of manufacturing tolerances.

FIGS. 9a–b illustrate the effect of crown on fly heights. In order to be able to adjust the flying height insitu in the disk drive, it is important to measure accurately the flying height in the disk drive. Methods for accurately measuring the flying height of the head in a disk drive are disclosed in U.S. Pat. No. 4,777,544, issued Oct. 11, 1988 to Bryon R. Brown et al. and assigned to International Business Machines Corporation, which is hereby incorporated by reference. In Brown et al., the amplitude of the magnetic signal at the nominal disk velocity is compared to the amplitude at the touch down velocity of the slider-disk combination using the Wallace spacing loss formula. In FIG. 9a, the slider 900 doesn't touch the disk 910 at the location of the element 912, but at the lowest point 920, which due the positive crown, is near the middle of the slider. The measured flying height (FH-M) 930 is lower than the actual spacing (FH-A) 932 between the magnetic element and the disk, at the nominal disk velocity. This underestimate 940 of the spacing can be several tens of nanometers, making it virtually impossible to determine spacings of 20 nm or less.

FIG. 9b illustrates a second embodiment of a self-limiting wear contact pad slider 950 according to the present invention. In FIG. 9b, the slider design solves this problem. If the height of the protruding pad 960 is comparable to the nominal positive crown value, on decreasing the disk velocity the slider 950 will touch the disk at a point on the pad 960 and thus very close to the magnetic head. Knowing the pitch angle of the slider and geometry of the crown, one can select the pad height, so that trailing end pad 960 touches the disk before other parts of the slider.

FIGS. 10a–b illustrate the self-limiting characteristics of the contact pad slider according to the present invention. The ABS design can be optimized to maximize performance without regard to impact on sensitivities to manufacturing tolerances. FIG. 10a illustrates the self-limiting wear contact pad slider with a first higher fly height 1000. The protruding element 1010 contacts the surface of the disk 1012 during burnishing. The first time the head flies on a 1014 disk, it is burnished by accessing across the disk several times. The protrusion 1010 will wear down until the contact force is zero. After burnish 1020, the self-limiting wear contact pad slider exhibits a clearance 1030 provided by the self-limiting wear characteristics of the protruding element.

FIG. 10b illustrates the self-limiting wear contact pad slider with a second lower fly height 1050. The protruding element 1060 still contacts the surface of the disk during burnishing 1014. After burnish 1020, the self-limiting wear contact pad slider exhibits the same clearance 1030 provided as exhibited in FIG. 10a. Thus, the self-limiting wear contact pad 1060 decouples the ABS design and manufacturing tolerances from contact force. The self-limiting wear contact pad slider improves magnetic performance by allowing the removal of recession and the carbon overcoat (COC). A tightly controlled spacing of a few nanometers can be achieved by applying additional wear.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider for supporting a transducer above a moving recording medium comprising:
    a support structure having a leading and a trailing edge relative to the motion of the recording medium; and
    an air bearing structure positioned on the support structure extending to the trailing edge of the support structure, the air bearing structure having an air bearing surface and a non-actuatable, wearable pad positioned at the trailing end of the air bearing structure and extending above the air bearing surface, the air bearing surface being formed to provide a desired fly height and the wearable pad having a surface area of less than 5% of a total air bearing surface area and a predetermined height so that wearing of the pad during use produces an interference of zero at the desired fly height and provides negligible lift to the slider.

2. The slider of claim 1 wherein the air bearing surface further comprises at least one aerodynamic lift surface level generating lift to provide the desired fly height, the non-actuatable, wearable pad comprising a last surface level extending above the at least one surface level of the air bearing surface.

3. The slider of claim 2 wherein the at least one surface level further comprises two surface levels.

4. The slider of claim 1 wherein the non-actuatable, wearable pad is formed around a magnetic sensor.

5. The slider of claim 1 wherein the air bearing surface is formed using two etch steps and the non-actuatable, wearable pad is formed using a third etch step.

6. The slider of claim 5 wherein the wearable pad forms a fourth surface level to the slider.

7. The slider of claim 1 wherein the predetermined height of the non-actuatable, wearable pad is selected to be greater than or equal to the desired fly height minus a disk roughness.

8. The slider of claim 1 further comprising at least one front air bearing pad.

9. The slider of claim 1 further comprising side rails extending along sides of the support structure.

10. The slider of claim 1 wherein the non-actuatable, wearable pad is formed of a material selected from the group comprising alumina, $TiC/Al_2O_3$ and silicon.

11. The slider of claim 1 wherein the non-actuatable, wearable pad comprises a surface area of less than 3.5% of a total air bearing surface area.

12. The slider of claim 1 wherein the non-actuatable, wearable pad comprises a surface area of less than 2% of a total air bearing surface area.

13. The slider of claim 1 wherein the non-actuatable, wearable pad comprises a surface area of 1% of a total air bearing surface area.

14. A system for storing and retrieving information, comprising:
    at least one rotating disk;
    a recording medium, disposed on the at least one rotating disk, the recording medium dragging air as the disk rotates and creating an air flow in parallel with a tangential velocity of the disk rotation;
    an actuator assembly disposed adjacent the at least one rotating disk for positioning a suspension assembly relative to the recording medium; and
    a slider disposed at a distal end of the suspension assembly for supporting a transducer above the rotating disk, the slider further comprising:
        a support structure having a leading and a trailing edge relative to the motion of the recording medium; and an air bearing structure positioned on the support structure extending to the trailing edge of the support structure, the air bearing structure having an air bearing surface and a non-actuatable, wearable pad positioned at the trailing end of the air bearing structure and extending above the air bearing surface, the air bearing surface being formed to provide a desired fly height and the wearable pad having a surface area of less than 5% of a total air bearing surface area and a predetermined height so that wearing of the pad during use produces an interference of zero at the desired fly height and provides negligible lift to the slider.

15. The system of claim 14 wherein the air bearing surface further comprises at least one aerodynamic lift surface level generating lift to provide the desired fly height, the non-actuatable, wearable pad comprising a last surface level extending above the at least one surface level of the air bearing surface.

16. The system of claim 15 wherein the at least one surface level further comprises two surface levels.

17. The system of claim 14 wherein the non-actuatable, wearable pad is formed around a magnetic sensor.

18. The system of claim 14 wherein the air bearing surface is formed using two etch steps and the wearable pad is formed using a third etch step.

19. The system of claim 18 wherein the non-actuatable, wearable pad forms a fourth surface level to the slider.

20. The system of claim 14 wherein the predetermined height of the non-actuatable, wearable pad is selected to be greater than or equal to the desired fly height minus a disk roughness.

21. The system of claim 14 further comprising at least one front air bearing pad.

22. The system of claim 14 further comprising side rails extending along sides of the support structure.

23. The system of claim 14 wherein the non-actuatable, wearable pad is formed of a material selected from the group comprising alumina, $TiC/Al_2O_3$ and silicon.

24. The system of claim 14 wherein the non-actuatable, wearable pad comprises a surface area of less than 3.5% of a total air bearing surface area.

25. The system of claim 14 wherein the non-actuatable, wearable pad comprises a surface area of less than 2% of a total air bearing surface area.

26. The system of claim 14 wherein the non-actuatable, wearable pad comprises a surface area of 1% of a total air bearing surface area.

* * * * *

UNITED STATES PATENT AND TRADEMARK OFFICE
CERTIFICATE OF CORRECTION

PATENT NO. : 6,714,382 B1
DATED : March 30, 2004
INVENTOR(S) : Alexopoulos et al.

It is certified that error appears in the above-identified patent and that said Letters Patent is hereby corrected as shown below:

Title page,
Item [73], Assignee, "Hitachi Global Storage Technologies (NL)" should read
-- Hitachi Global Storage Technologies, Netherlands B.V. --

Column 2,
Lines 56 and 57, "Vol. 26, No. Sep. 5, 1990" should read
-- Vol. 26, No. 5, Sept. 1990 --.

Signed and Sealed this

Twenty-second Day of June, 2004

JON W. DUDAS
*Acting Director of the United States Patent and Trademark Office*